US012755713B2

(12) United States Patent
He et al.

(10) Patent No.: US 12,755,713 B2
(45) Date of Patent: Oct. 6, 2026

(54) COMPENSATION METHOD OF DISPLAY PANEL AND DISPLAY PANEL CONFIGURED TO PERFORM THE SAME

(71) Applicant: Shenzhen China Star Optoelectronics Semiconductor Display Technology Co., Ltd., Shenzhen (CN)

(72) Inventors: Jhenwei He, Shenzhen (CN); Xingwu Ma, Shenzhen (CN); Guanxian He, Shenzhen (CN); Chaoping Li, Shenzhen (CN); Jianmin Nie, Shenzhen (CN); Qian Wang, Shenzhen (CN); Yuhua Chang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 355 days.

(21) Appl. No.: 18/531,792

(22) Filed: Dec. 7, 2023

(65) Prior Publication Data

US 2025/0131893 A1 Apr. 24, 2025

(30) Foreign Application Priority Data

Oct. 18, 2023 (CN) ........................ 202311359578.1

(51) Int. Cl.
*G09G 3/36* (2006.01)

(52) U.S. Cl.
CPC ......... *G09G 3/3648* (2013.01); *G09G 3/3607* (2013.01); *G09G 2300/0426* (2013.01); *G09G 2300/0452* (2013.01); *G09G 2310/08* (2013.01)

(58) Field of Classification Search
CPC ............... G09G 3/3648; G09G 3/3607; G09G 2300/0426; G09G 2300/0452; G09G 2310/08; G09G 3/3614; G09G 2320/028
See application file for complete search history.

(56) References Cited

U.S. PATENT DOCUMENTS

| | | | | |
|---|---|---|---|---|
| 9,263,477 | B1 * | 2/2016 | Du | G02F 1/13452 |
| 2014/0132651 | A1 * | 5/2014 | Hung | G09G 3/3648 345/694 |
| 2017/0069250 | A1 * | 3/2017 | Wang | G09G 3/2074 |
| 2017/0140716 | A1 * | 5/2017 | Xu | G09G 3/3233 |
| 2018/0204499 | A1 * | 7/2018 | Bae | G09G 3/3674 |
| 2019/0131324 | A1 * | 5/2019 | Jiang | H10D 86/443 |

(Continued)

*Primary Examiner* — Rodney Amadiz

(74) *Attorney, Agent, or Firm* — PV IP PC; Christopher Ruprecht; Wei Te Chung

(57) ABSTRACT

A display panel includes a plurality of data lines, a plurality of first sub-pixels and at least one second sub-pixel connected to the same data line. The at least one second sub-pixels are disposed between the plurality of the first sub-pixels, and compensation method of the display panel includes controlling each of the first sub-pixels to load a corresponding one of first data voltages in a first period, wherein a plurality of the first data voltages are in a first voltage interval and controlling each of the at least one second sub-pixel to load a corresponding one of second data voltages in a second period, wherein the plurality of second data voltages are in a second voltage interval, the second period does not overlap with the first period, and the second voltage interval does not overlap with the first voltage interval.

20 Claims, 6 Drawing Sheets

(56) References Cited

U.S. PATENT DOCUMENTS

| | | | | |
|---|---|---|---|---|
| 2019/0172381 | A1* | 6/2019 | Kim | G09G 3/3208 |
| 2021/0201787 | A1* | 7/2021 | Yuan | G09G 3/3291 |
| 2023/0138235 | A1* | 5/2023 | Xu | G09G 3/20 345/694 |
| 2024/0127744 | A1* | 4/2024 | Park | G09G 3/32 |

* cited by examiner

COMPENSATION METHOD OF DISPLAY PANEL AND DISPLAY PANEL CONFIGURED TO PERFORM THE SAME

CROSS REFERENCE TO RELATED APPLICATIONS

The present application claims priority to Chinese Patent Application No. 202311359578.1, filed on Oct. 18, 2023, and entitled "DISPLAY PANEL AND COMPENSATION METHOD OF SAME". The entire disclosures of the above application are incorporated herein by reference.

TECHNICAL FIELD

The present application relates to the field of display technology, in particular to the manufacture of display devices, specifically a display panel and a compensation method of same.

BACKGROUND

Fringe Field Switching (FFS) Liquid Crystal Display Panels or in-Plane Switching (IPS)

In liquid crystal display panels, a four-domain pixel architecture can achieve both high resolution and high transmittance compared to an eight-domain pixel architecture. However, the four-domain pixel architecture suffers from higher side brightness, which causes deterioration in viewing angle characteristics. Generally, two adjacent sub-pixels of the same color are respectively set to a higher gray level and a lower gray level relative to an original gray level to reduce a side-view brightness and thereby improve a deterioration of viewing angle characteristics.

However, since sub-pixels with the same color are all connected to the same data line. The above operations may cause data signals transmitted by data lines to include alternately arranged higher data voltages and lower data voltages. That is, a jump of two adjacent data voltages is large, resulting in low charging efficiency of the sub-pixel. This results in that voltages actually reached by two adjacent sub-pixels after being charged are respectively less than the higher data voltage and greater than the lower data voltage. This reduces the difference in data voltage between the two, which is not conducive to reducing the side-view brightness and reduces the improvement effect of deteriorating viewing angle characteristics.

Therefore, the effect of the existing four-domain pixel architecture on improving the deterioration of viewing angle characteristics is affected by the lower charging efficiency, which is not ideal.

SUMMARY

The purpose of the present invention is to provide a display panel and a compensation method thereof to solve the technical problem that the existing four-domain pixel architecture's effect of improving viewing angle characteristics and deterioration is affected by low charging efficiency.

The present invention provides a compensation method of a display panel, including:

wherein the display panel comprises a plurality of data lines, a plurality of first sub-pixels and at least one second sub-pixel connected to the same data line, the at least one second sub-pixels are disposed between the plurality of the first sub-pixels, and the method comprises:

controlling each of the first sub-pixels to load a corresponding one of first data voltages in a first period, wherein a plurality of the first data voltages are in a first voltage interval;

controlling each of the at least one second sub-pixel to load a corresponding one of second data voltages in a second period, wherein the plurality of second data voltages are in a second voltage interval, the second period does not overlap with the first period, and the second voltage interval does not overlap with the first voltage interval.

In an embodiment, the plurality of first data voltages respectively loaded on the plurality of first sub-pixels are the same, and/or the plurality of second data voltages respectively loaded on the plurality of second sub-pixels are the same.

In an embodiment, a number of the second sub-pixels is greater than or equal to 2, a color of the first sub-pixels and a color of the second sub-pixels are the same, and the first sub-pixels and the second sub-pixels are arranged alternately.

In an embodiment, the first period and the second period are included in the same frame period.

In an embodiment, controlling each of the first sub-pixels to load the corresponding one of first data voltages comprises:

acquiring the first data voltages corresponding to the first sub-pixels, and continuously arranging the first data voltages to form a first data voltage string;

transmitting the first data voltage string through the data line, and sequentially turning on the first sub-pixels, so that each of the first sub-pixels is loaded with the corresponding one of first data voltages.

In an embodiment, before controlling each of the first sub-pixels to load the corresponding one of first data voltages and controlling each of the at least one second sub-pixel to load the corresponding one of second data voltages comprises:

acquiring an original data voltage string, wherein the original data voltage string comprises the first data voltages and the at least one second data voltage corresponding to at least one of the second sub-pixels, and the second data voltages are arranged between the first data voltages.

In an embodiment, the data lines are further connected to at least one third sub-pixel, the at least one third sub-pixel is provided between the first sub-pixels, and there is one first sub-pixel between the at least one second sub-pixel and the at least one third sub-pixel, the method further comprises:

controlling each third sub-pixel to load a corresponding third data voltage during a third period, wherein the third data voltages are in a third voltage interval, the third period, the second period, and the first period do not overlap, the third voltage interval, the second voltage interval, and the first voltage interval do not overlap, and both the second voltage interval and the third voltage interval are greater than or less than the first voltage interval.

In an embodiment, a number of the second sub-pixels and a number of the third sub-pixels are both greater than or equal to 2, the data lines are connected to a plurality of pixel groups, and each pixel group comprises one second sub-pixel, one first sub-pixel, one third sub-pixel, and another first sub-pixel arranged in sequence.

In an embodiment, the display panel comprises a plurality of sub-pixels, and the sub-pixels comprises the first sub-pixels and the second sub-pixels;

wherein controlling each of the first sub-pixels to load the corresponding one of first data voltages in the first period comprises:

sequentially scanning a plurality of rows of the sub-pixels in a first sub-frame period in a frame period, and when the plurality of rows of the sub-pixels are turned on sequentially, sequentially loading corresponding plurality of the first data voltages, wherein the first period is included in the first sub-frame period;

wherein controlling each of the at least one second sub-pixel to load the corresponding one of second data voltages in the second period comprises:

sequentially scanning a plurality of rows of the sub-pixels in a second sub-frame period in a frame period, and when the plurality of rows of second sub-pixels are turned on sequentially, sequentially loading corresponding plurality of second data voltages, wherein the second period is included in the second sub-frame period, and a duration of the first sub-frame period is equal to a duration of the second sub-frame period.

The present invention further provides a display panel configured to perform the compensation method of the display panel as described in any one of the above. The display panel comprises a plurality of data lines, a plurality of first sub-pixels and at least one second sub-pixel connected to the same data line, the at least one second sub-pixels are disposed between the plurality of the first sub-pixels, and the method comprises:

controlling each of the first sub-pixels to load a corresponding one of first data voltages in a first period, wherein a plurality of the first data voltages are in a first voltage interval;

controlling each of the at least one second sub-pixel to load a corresponding one of second data voltages in a second period, wherein the plurality of second data voltages are in a second voltage interval, the second period does not overlap with the first period, and the second voltage interval does not overlap with the first voltage interval.

In an embodiment, the plurality of first data voltages respectively loaded on the plurality of first sub-pixels are the same.

In an embodiment, the plurality of second data voltages respectively loaded on the plurality of second sub-pixels are the same.

In an embodiment, a number of the second sub-pixels is greater than or equal to 2, a color of the first sub-pixels and a color of the second sub-pixels are the same, and the first sub-pixels and the second sub-pixels are arranged alternately.

In an embodiment, the first period and the second period are included in the same frame period.

In an embodiment, controlling each of the first sub-pixels to load the corresponding one of first data voltages comprises:

acquiring the first data voltages corresponding to the first sub-pixels, and continuously arranging the first data voltages to form a first data voltage string;

transmitting the first data voltage string through the data line, and sequentially turning on the first sub-pixels, so that each of the first sub-pixels is loaded with the corresponding one of first data voltages.

In an embodiment, before controlling each of the first sub-pixels to load the corresponding one of first data voltages and controlling each of the at least one second sub-pixel to load the corresponding one of second data voltages comprises:

acquiring an original data voltage string, wherein the original data voltage string comprises the first data voltages and the at least one second data voltage corresponding to at least one of the second sub-pixels, and the second data voltages are arranged between the first data voltages.

In an embodiment, the data lines are further connected to at least one third sub-pixel, the at least one third sub-pixel is provided between the first sub-pixels, and there is one first sub-pixel between the at least one second sub-pixel and the at least one third sub-pixel, the method further comprises:

controlling each third sub-pixel to load a corresponding third data voltage during a third period, wherein the third data voltages are in a third voltage interval, the third period, the second period, and the first period do not overlap, the third voltage interval, the second voltage interval, and the first voltage interval do not overlap, and both the second voltage interval and the third voltage interval are greater than or less than the first voltage interval.

In an embodiment, a number of the second sub-pixels and a number of the third sub-pixels are both greater than or equal to 2, the data lines are connected to a plurality of pixel groups, and each pixel group comprises one second sub-pixel, one first sub-pixel, one third sub-pixel, and another first sub-pixel arranged in sequence.

In an embodiment, the display panel comprises a plurality of sub-pixels, and the sub-pixels comprises the first sub-pixels and the second sub-pixels.

In an embodiment, controlling each of the first sub-pixels to load the corresponding one of first data voltages in the first period comprises:

sequentially scanning a plurality of rows of the sub-pixels in a first sub-frame period in a frame period, and when the plurality of rows of the sub-pixels are turned on sequentially, sequentially loading corresponding plurality of the first data voltages, wherein the first period is included in the first sub-frame period;

wherein controlling each of the at least one second sub-pixel to load the corresponding one of second data voltages in the second period comprises:

sequentially scanning a plurality of rows of the sub-pixels in a second sub-frame period in a frame period, and when the plurality of rows of second sub-pixels are turned on sequentially, sequentially loading corresponding plurality of second data voltages, wherein the second period is included in the second sub-frame period, and a duration of the first sub-frame period is equal to a duration of the second sub-frame period.

The present invention provides a display panel and a compensation method thereof. The display panel includes a plurality of data lines and a plurality of first sub-pixels and at least one second sub-pixel connected to the same data line. The second sub-pixels are disposed between the plurality of first sub-pixels. The method controls each of the first sub-pixels to load a corresponding first data voltage and each of the second sub-pixels to load a corresponding second data voltage in a non-overlapping first period and a second period respectively. A first voltage interval in which the plurality of first data voltages are located and a second voltage interval in which the plurality of second data voltages are located do not overlap. This allows the data line to continuously transmit a plurality of first data voltages with smaller variables and then continuously transmit a plurality of second data voltages with smaller variables. This reduces a frequency of voltage jumps, thereby effectively improving a charging efficiency of the first sub-pixel and a charging efficiency of the second sub-pixel. Thereby, the effect of improving a deterioration of viewing angle characteristics in the liquid crystal display panel is improved, and reliability of a screen display of the display panel is improved.

BRIEF DESCRIPTION OF THE DRAWINGS

In order to illustrate the technical solutions more clearly in the embodiments of the present application, the following briefly introduces the drawings that need to be used in the description of the embodiments. Obviously, the drawings in the following description are only some embodiments of the present application. For those skilled in the art, other drawings can also be obtained based on these drawings without any creative effort.

DETAILED DESCRIPTION OF ILLUSTRATED EMBODIMENTS

The technical solutions in the present application will be clearly and completely described below with reference to the accompanying drawings in the embodiments of the present application. Obviously, the described embodiments are only some of the embodiments of the present application, but not all of the embodiments. Based on the embodiments in the present application, all other embodiments obtained by those skilled in the art without creative efforts fall within the scope of protection of the present application.

In the description of the present invention, the terms “first”, “second”, etc. are used for descriptive purposes only and cannot be understood as indicating or implying relative importance or implicitly indicating the number of indicated technical features. Thus, features defined as “first” and “second” may explicitly or implicitly include one or more of the described features. In addition, it should be noted that the drawings only provide structures that are closely related to the present invention, and some details that are not closely related to the invention are omitted. The purpose is to simplify the drawings to make the invention clear at a glance, rather than to show that the actual device is exactly the same as the drawings, and does not serve as a limitation of the actual device.

Reference herein to “an embodiment” means that a particular feature, structure or characteristic described in connection with the embodiment can be included in at least one embodiment of the present invention. The appearances of this phrase at various places in the specification are not necessarily all referring to the same embodiment, nor are separate or alternative embodiments mutually exclusive of other embodiments. Those skilled in the art understand, both explicitly and implicitly, that the embodiments described herein may be combined with other embodiments.

The present invention provides a compensation method of a display panel, which method includes but is not limited to the following embodiments and combinations of the following embodiments.

Figure 1:
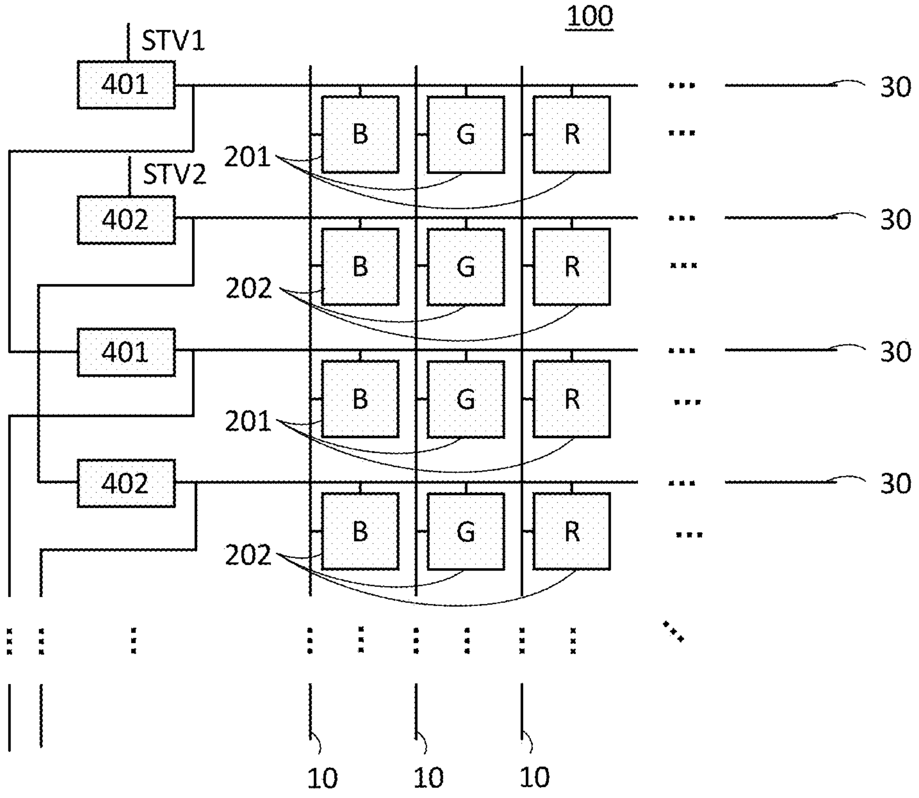
FIG. 1 to FIG. 3 are schematic top views of display panels provided by embodiments of the present invention.
Figure 2:
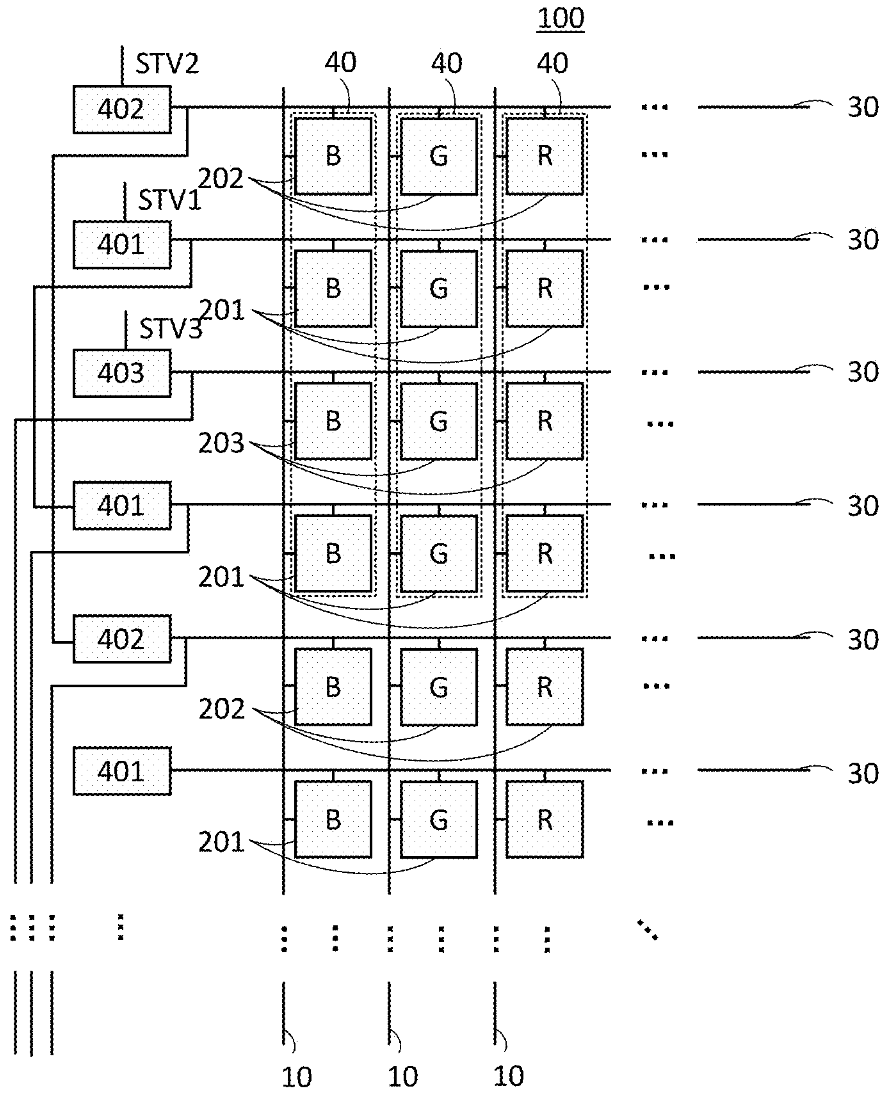
Figure 3:
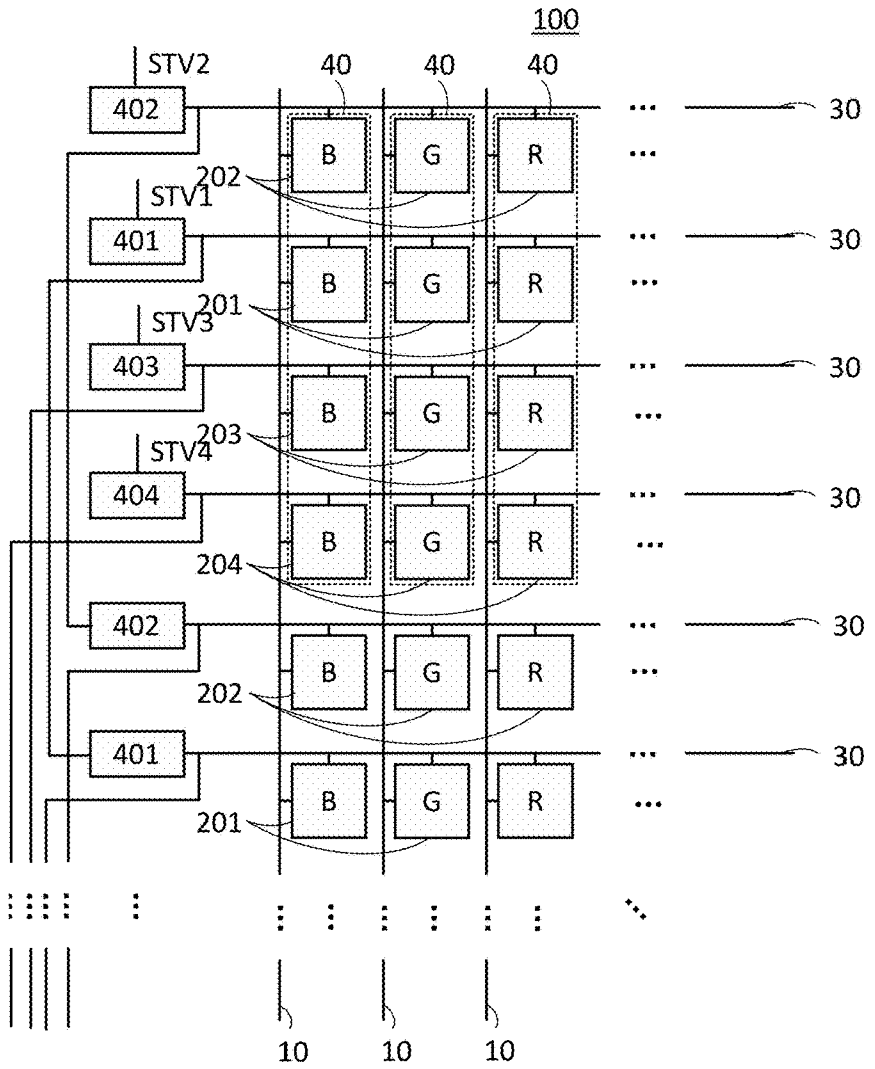
Figure 4:
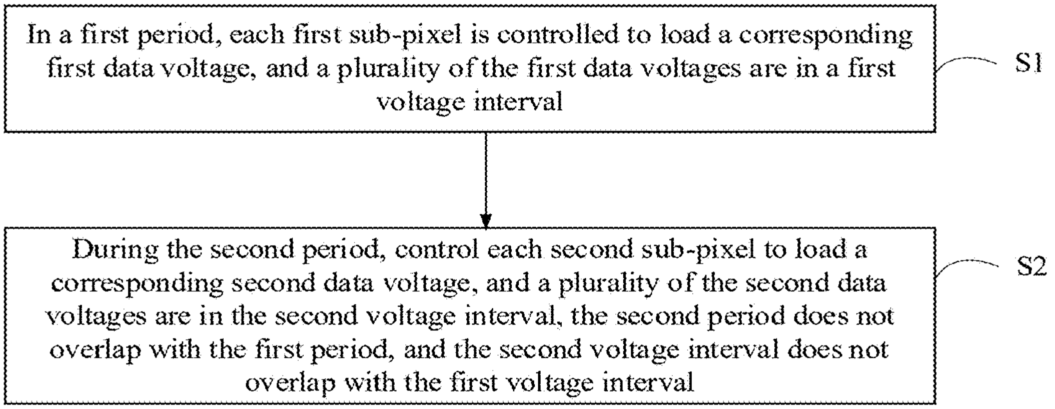
FIG. 4 to FIG. 6 and FIG. 11 are several flowcharts of compensation methods of display panels provided by embodiments of the present invention.

In one embodiment, as shown in FIG. 1 to FIG. 3, the display panel 100 includes a plurality of data lines 10, a plurality of first sub-pixels 201 and at least one second sub-pixel 202 connected to the same data line 10. The second sub-pixels 202 are disposed between the plurality of first sub-pixels 201. As shown in FIG. 4, the compensation method of the display panel 100 includes but is not limited to the following steps.

S1: In a first period, each first sub-pixel is controlled to load a corresponding first data voltage, and a plurality of the first data voltages are in a first voltage interval.

In this embodiment, the type of the display panel 100 is not limited, and may be, but is not limited to, a liquid crystal panel or a self-luminous panel. The number of data lines 10 may be multiple, and each data line 10 may be connected to multiple sub-pixels. It can be considered that there is at least one data line 10 connected in sequence to a first part of the first sub-pixel 201, at least a second part of the sub-pixel 202 and a second part of the second sub-pixel 202201. Furthermore, the data signal transmitted by the data line 10 can be used to drive the corresponding plurality of first sub-pixels 201 and the corresponding at least one second sub-pixel 202 to emit light.

Furthermore, the data signal transmitted by the data line 10 can be used to drive the corresponding plurality of first sub-pixels 201 and the corresponding at least one second sub-pixel 202 to emit light.

S2: During the second period, control each second sub-pixel to load a corresponding second data voltage, and a plurality of the second data voltages are in the second voltage interval, the second period does not overlap with the first period, and the second voltage interval does not overlap with the first voltage interval.

Specifically, in this embodiment, the plurality of first data voltages V1 and the plurality of second data voltages V2 are respectively in the first voltage interval and the second voltage interval without intersection. That is, the first data voltage V1 and the second data voltage V2 have a large difference, and the second sub-pixels 202 are provided between the plurality of first sub-pixels 201. If the data signal includes a first part of the first data voltage V1, at least a second data voltage V2, and a second part of the first data voltage V1 respectively correspond to the first part 201, the at least one second sub-pixel 202, and the second part of the second sub-pixel 202201, it can be considered that when the data signal transmitted by the data line 10 switches from the first data voltage V1 to the second data voltage V2, and when it switches from the second data voltage V2 to the first data voltage V1, due to the large voltage jump, there is a parasitic capacitance between the data line 10 and the transistor in the pixel circuit, this causes the voltage on the first sub-pixel 201 and the voltage on the second sub-pixel 202 to rise or fall slowly during the charging process. As a result, the one of the first sub-pixel 201 and the second sub-pixel 202 that is later affected by the corresponding first data voltage V1 or second data voltage V2 has a problem of insufficient charging. That is, an absolute value of the difference between the voltage actually transmitted to the first sub-pixel 201 and the voltage transmitted to the second sub-pixel 202 may be less than an absolute value of the difference between the first data voltage V1 and the second data voltage V2.

It should be noted that for the liquid crystal display panel 100, generally the same data line 10 connects multiple sub-pixels of the same color. When improving the deterioration of viewing angle characteristics, each two adjacent sub-pixels of the same color are specially loaded with two voltages with large voltage differences. Compared with loading the voltage between the two "largely different voltages", the overall side-view brightness of the two can be reduced. It is understood that, when the liquid crystal display panel 100 and the self-luminous display panel 100 display images normally, there may also be situations where two adjacent sub-pixels connected to the same data line 10 are respectively loaded with two voltages with large voltage differences.

It can be understood that the second period in this embodiment does not overlap with the first period. That is to say, the data line 10 in this embodiment transmits a plurality of first data voltages V1 with similar voltages (all in the first voltage interval) in the first period and the second period that are set apart. That is, the plurality of first data voltages V1 can not exactly the same), multiple second data voltages V2 with similar voltages (all in the second voltage interval, that is, the multiple second data voltages V2 may not be exactly the same). During the first period and the second period, there is almost no voltage jump, which effectively improves the charging efficiency of the first sub-pixel 201 and the charging efficiency of the second sub-pixel 202. That is, the effect of improving the deterioration of viewing angle characteristics in the liquid crystal display panel 100 can be improved, and the reliability of screen display of the display panel 100 can be improved.

In one embodiment, the plurality of first data voltages V1 respectively loaded by the plurality of first sub-pixels 201 are the same, and/or the plurality of first data voltages V1 respectively loaded by the plurality of second sub-pixels 202 are the same. The two data voltages V2 are the same. That is, during the first period, the data line 10 is used to transmit a constant voltage (equal to the first data voltage V1), and/or, during the second period, the data line 10 is used to transmit a constant voltage (equal to the second data voltage V2). This can further reduce the voltage jump amplitude in at least one of the first period and the second period of the data line 10. That is, at least one of the voltage jump amplitudes is 0, which can further improve the issue of insufficient charging of the first sub-pixel 201 and the second sub-pixel 202. This further improves the effect of improving the deterioration of viewing angle characteristics and the reliability of screen display of the display panel 100.

Figure 5:
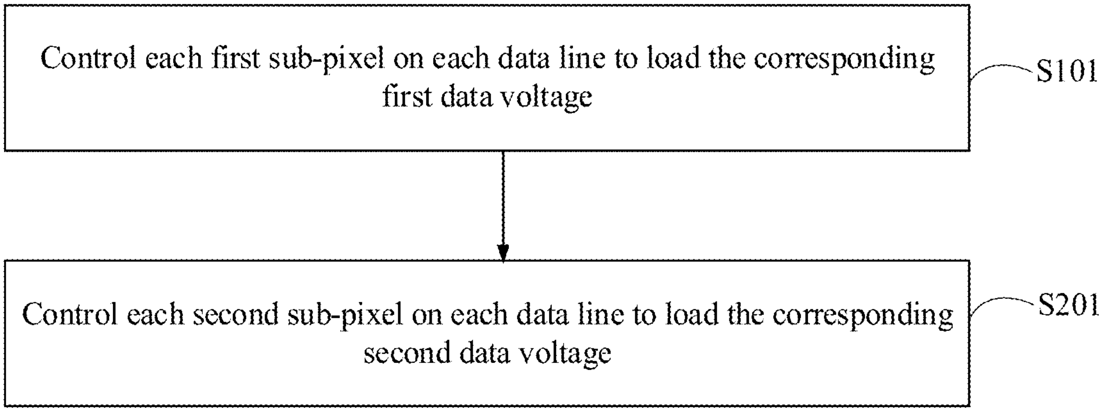

In one embodiment, as shown in FIG. 1 to FIG. 3, each data line 10 is connected to a corresponding plurality of first sub-pixels 201 and a corresponding at least one second sub-pixel 202. As shown in FIG. 5, the step S1 includes but is not limited to the following steps: S101: Control each first sub-pixel 201 on each data line 10 to load the corresponding first data voltage V1. The step S2 includes but is not limited to the following steps: S201: Control each second sub-pixel 202 on each data line 10 to load the corresponding second data voltage V2.

Specifically, this embodiment further limits the arrangement of the first sub-pixels 201 and the second sub-pixels 202 connected to each data line 10 to be the same. Combining step S101 and step S201, it can be seen that the plurality of first sub-pixels 201 connected to each data line 10 in this embodiment can be loaded with the first data voltage V1 in the first period. The plurality of second sub-pixels 202 connected to each data line 10 may be loaded with the second data voltage V2 during the second period. That is to say, within the first period, the plurality of data lines 10 can be controlled to sequentially transmit a plurality of first data voltages V1 to respectively load the corresponding plurality of first sub-pixels 201. During the second period, the plurality of data lines 10 can be controlled to sequentially transmit at least one second data voltage V2 to be respectively loaded onto the corresponding at least one second sub-pixel 202.

As shown in FIG. 1 to FIG. 3, the display panel 100 may further include a plurality of gate lines 30. A sub-pixel corresponding to each data line 10 can be electrically connected to the same gate line 30. For example, the first sub-pixel 201 corresponding to each data line 10 can be electrically connected to the same gate line 30. The second first sub-pixel 201 corresponding to each data line 10 can be electrically connected to another gate line 30. The first and second sub-pixels 202 corresponding to each data line 10 can be electrically connected to another gate line 30. Each gate line can be used to transmit a corresponding gate signal to control multiple electrically connected sub-pixels (all being the first sub-pixel 201, the second sub-pixel 202 or other sub-pixels) to be turned on at the same period. The turn-on period may satisfy that the multiple voltages in the multiple data signals respectively transmitted by the multiple data lines 10 during this period are exactly equal to the multiple sub-pixels loaded with multiple voltages to complete the correct transmission of the voltage.

For convenience of description, in the present invention, multiple sub-pixels are arranged along the row direction and the column direction to form a matrix as an example. It can be considered that during the first period, the plurality of gate signals respectively transmitted by the plurality of gate lines (for example, at least the first and third gate lines in FIG. 1, at least the second, fourth, and sixth gate lines in FIG. 2, and at least the second and sixth gate lines in FIG. 3) corresponding to the plurality of rows of first sub-pixels 201 may each include a plurality of gate effective pulses. Multiple gate effective pulses are sequentially arranged at starting points on the time axis (pulse widths may be the same), so that corresponding first sub-pixels 201 in multiple rows can be turned on sequentially to be loaded with corresponding multiple first data voltages V1 in sequence. Similarly, in the first period, the plurality of gate signals respectively transmitted by the plurality of gate lines (For example, at least the second and fourth gate lines in FIG. 1, at least the first and fifth gate lines in FIG. 2, and at least the first and fifth gate lines in FIG. 3) corresponding to the plurality of rows of second sub-pixels 202 may respectively include a plurality of gate effective pulses. Multiple gate effective pulses are sequentially arranged at starting points on the time axis (pulse widths may be the same), so that corresponding multiple rows of second sub-pixels 202 can be turned on sequentially to be loaded with corresponding multiple second data voltages V2 in sequence.

In one embodiment, as shown in FIG. 1, the number of the second sub-pixels 202 is greater than or equal to 2. The color of the first sub-pixel 201 and the color of the second sub-pixel 202 are the same, and the first sub-pixel 201 and the second sub-pixel 202 are arranged alternately. Based on the above discussion, all first data voltages V1 and all second data voltages V2 are respectively in the first voltage interval and the second voltage interval. Furthermore, in this embodiment, the first sub-pixels 201 and the second sub-pixels 202 are arranged in an alternating arrangement. That is, each of the two sub-pixels (the first sub-pixel 201 and the second sub-pixel 202) of the same color and arranged adjacently can be loaded with the first data voltage V1 and the second data voltage V2 that are very different. Based on the above discussion, it can be seen that the issue of deterioration in viewing angle characteristics of the multi-domain structure in the liquid crystal display panel 100 can be improved.

Specifically, as shown in FIG. 1, multiple sub-pixels connected to the same data line 10 may have the same color. For example, from left to right, the first data line 10 may be provided with multiple blue sub-pixels B, the second data line 10 may be provided with multiple green sub-pixels G, and the third data line 10 may be provided with multiple red sub-pixel R. The plurality of blue sub-pixels B, the plurality of green sub-pixels G, and the plurality of red sub-pixels R may each include a plurality of first sub-pixels 201 located in odd-numbered rows and a plurality of second sub-pixels 202 located in even-numbered rows. That is, for the sub-pixels of each color, the first sub-pixels 201 and the second sub-pixels 202 respectively loaded with the first data voltage V1 and the second data voltage V2 can be arranged alternately. Therefore, the side-view brightness corresponding to each color sub-pixel can be reduced to improve the overall viewing angle characteristic deterioration issue.

Figure 6:
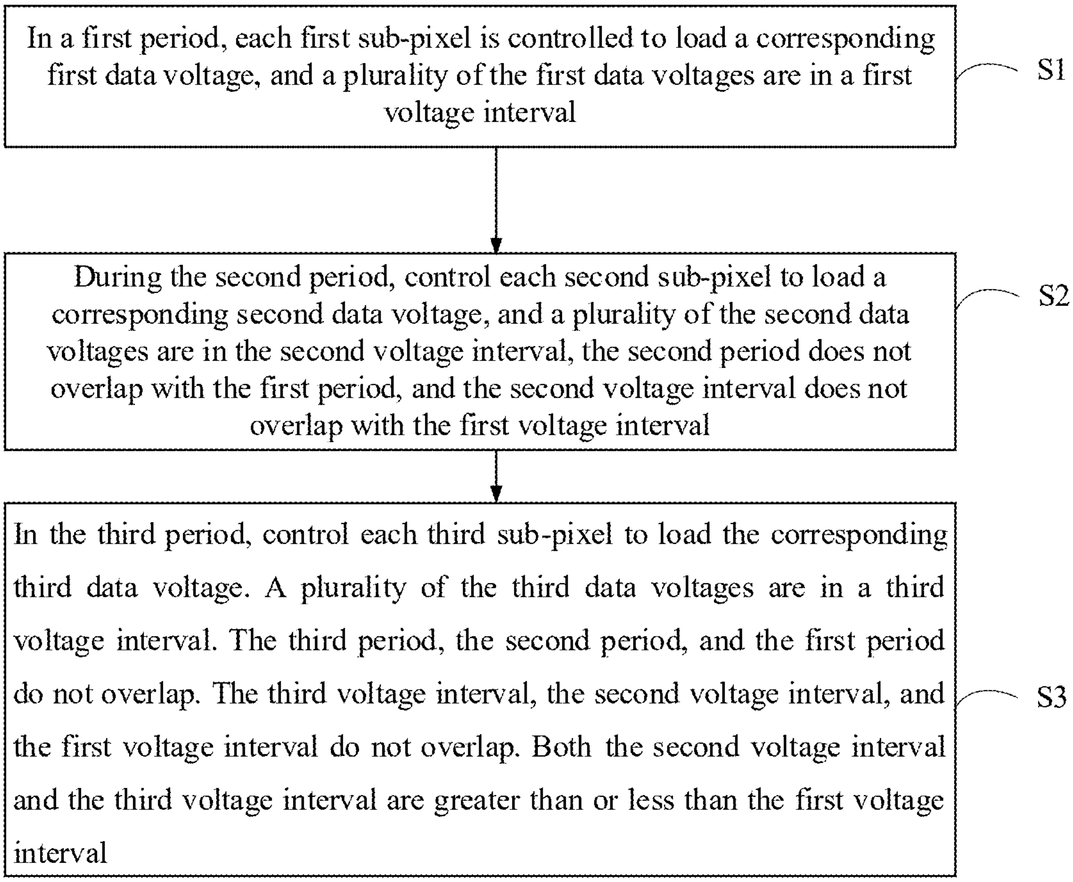

In one embodiment, as shown in FIG. 2 to FIG. 3, the data line 10 is further provided with at least one third sub-pixel 203. The third sub-pixel 203 is disposed between a plurality of first sub-pixels 201, and one first sub-pixel 201 is disposed between the second sub-pixel 202 and the third sub-pixel 203, as shown in FIG. 6, the method further includes but is not limited to the following steps.

S3: In the third period, control each third sub-pixel to load the corresponding third data voltage. A plurality of the third data voltages are in a third voltage interval. The third period, the second period, and the first period do not overlap. The third voltage interval, the second voltage interval, and the first voltage interval do not overlap. Both the second voltage interval and the third voltage interval are greater than or less than the first voltage interval.

The order of steps S1 to S3 is not limited. According to the different voltages loaded on the sub-pixels, on the basis of being divided into the first sub-pixel 201 and the second sub-pixel 202, it can also be divided into at least one third sub-pixel 203 loaded with at least a third data voltage V3. Similarly, in order to improve the issue of deterioration of viewing angle characteristics of the multi-domain structure in the liquid crystal display panel 100, in this embodiment, third sub-pixels 203 are disposed between the plurality of first sub-pixels 201. Furthermore, a first sub-pixel 201 is also provided between the second sub-pixel 202 and the third sub-pixel 203. Combining with the discussion in step S3 that "both the second voltage interval and the third voltage interval are greater than or less than the first voltage interval", it can be seen that, in this embodiment, a plurality of first sub-pixels 201 and at least one second sub-pixel 202 respectively loaded with a plurality of first data voltages V1 and at least a second data voltage V2, both of which are larger or smaller, are respectively connected to two ends of the first sub-pixel 201 loaded with a smaller or larger first data voltage V1. Similarly, the color of the first sub-pixel 201, the color of the second sub-pixel 202, and the color of the third sub-pixel 203 may be the same. In this way, it is still possible to realize that two sub-pixels (one of the second sub-pixel 202 and the third sub-pixel 203 and the first sub-pixel 201) of the same color and arranged adjacently can be loaded with two voltages with large differences (respectively in one of the smaller or larger second voltage interval and the third interval and the first voltage interval).

Based on the above discussion, it can be seen that this embodiment is equivalent to further dividing multiple larger or smaller voltages into the second voltage interval or the third voltage interval, and at both ends of the first sub-pixel 201 corresponding to the first voltage interval, there are respectively provided corresponding voltage intervals, although both are greater than or less than the first voltage interval. However, the second sub-pixel 202 and the third sub-pixel 203 having different second voltage intervals and third voltage intervals are further differentiated, which is more conducive to improving the deterioration of viewing angle characteristics.

It can be understood that based on multiple sub-pixels of the same color connected to the same data line 10, in comparison, if it is only divided into the first sub-pixel 201 and the second sub-pixel 202, this embodiment can be understood as, the multiple voltages corresponding to the "multiple sub-pixels" are evenly divided into more voltage intervals (including but not limited to the above three voltage intervals) according to the upper and lower limits to further reduce the difference between each two voltage intervals. This embodiment can also be understood as further dividing the first voltage interval or the second voltage interval mentioned above (corresponding to FIG. 1). Taking the further division of the first voltage interval as an example here, a new first voltage interval and a new third voltage interval can be obtained, and the difference between the two is minimal. Similarly, in this embodiment, in the third period that is different from the first period and the second period, respective third data voltages V3 are loaded to all third sub-pixels 203 to control their light emission.

In one embodiment, as shown in FIG. 2, the number of the second sub-pixels 202 and the number of the third sub-pixels 203 are both greater than or equal to 2. The data line 10 is connected to a plurality of pixel groups 40. Each pixel group includes one second sub-pixel 202, one first sub-pixel 201, one third sub-pixel 203, and another first sub-pixel 201 arranged in sequence. Specifically, as discussed above, both the second voltage interval and the third voltage interval are greater than or less than the first voltage interval. That is, the second voltage interval and the third voltage interval here can be understood as being further divided by the "second voltage interval" in FIG. 1. Therefore, for a plurality of continuously arranged first sub-pixels 201, three consecutively arranged first sub-pixels 201 are taken as an example. As shown in FIG. 2, it can be considered that a third sub-pixel 203 loaded with the third data voltage V3 may be disposed between the two relatively front first sub-pixels 201. The first sub-pixel 201 loaded with the first data voltage V1 may be disposed between the two relatively rear first sub-pixels 201. Therefore, overall, multiple sub-pixels (each of the plurality of blue sub-pixels B, the plurality of green sub-pixels G, and the plurality of green sub-pixels G) connected to the same data line 10 can be divided into multiple pixel groups according to the above-mentioned division method.

Further, as shown in FIG. 3, multiple sub-pixels connected to the same data line 10 may also include multiple fourth sub-pixels 204. Similarly, in the fourth period that is different from the first period, the second period, and the third period, each fourth sub-pixel can be controlled to load the corresponding fourth data voltage V4. A plurality of the fourth data voltages V4 are in the fourth voltage interval. In the same way, this can be understood as, the multiple voltages corresponding to the "multiple sub-pixels" are evenly divided into more voltage intervals (to obtain including but not limited to the above four voltage intervals) according to the upper limit and lower limit, so as to further reduce the difference between each two voltage intervals. It can also be understood here that one of the first voltage interval and the second voltage interval mentioned above (corresponding to FIG. 1) is further divided to obtain a new first voltage interval and a new fourth voltage interval, the other is further divided to obtain a new second voltage interval and a new third interval.

Specifically, as shown in FIG. 3, here, for example, the first voltage interval and the fourth voltage interval are both greater than or less than the second voltage interval and the third voltage interval. Taking multiple sub-pixels connected to the same data line 10 as an example, the second sub-pixels 202 and the third sub-pixels 203 may be arranged alternately. In the same way, a plurality of first sub-pixels 201 and a plurality of fourth sub-pixels are alternately arranged, and a first sub-pixel 201 or a fourth sub-pixel may be provided between the adjacent second sub-pixel 202 and the third sub-pixel 203. Correspondingly, it may also be consistent that a second sub-pixel 202 or a third sub-pixel 203 may be provided between the adjacent first sub-pixel 201 and the fourth sub-pixel. At this time, it can be considered that each pixel group includes a second sub-pixel 202, a first sub-pixel 201, a third sub-pixel 203, and a fourth sub-pixel connected in sequence.

In one embodiment, as shown in FIG. 1 to FIG. 3, the first period and the second period are included in the same frame period. The frame period of the present invention can be calculated based on the refresh rate of the display panel and can be the reciprocal of the refresh rate. That is, within one frame period, it can be divided into at least a first period and a second period. The settings discussed above are performed in conjunction with multiple gate signals transmitted separately by multiple gate lines. Corresponding (multiple) first data voltages V1 are loaded (respectively) to (all) the first sub-pixels 201 through (all) the data lines 10 during the first period. Corresponding second data voltages V2 are loaded (respectively) to (all) the second sub-pixels 202 through (all) the data lines 10 during the second period. That is, by time-sharing controlling all the first sub-pixels 201 to emit light and all the second sub-pixels 202 to emit light in the same frame period, to realize that the data line 10 may not alternately transmit the first data voltage V1 and the second data voltage V2. This reduces the risk of a large voltage jump in the data signal, thereby improving the effect of improving the deterioration of viewing angle characteristics in the liquid crystal display panel 100 and improving the reliability of the screen display of the display panel 100. Within one frame period, multiple first sub-pixels 201 are controlled to start emitting light and multiple second sub-pixels 202 are controlled to start emitting light in a time-sharing manner, thereby forming a complete picture.

Figure 7:
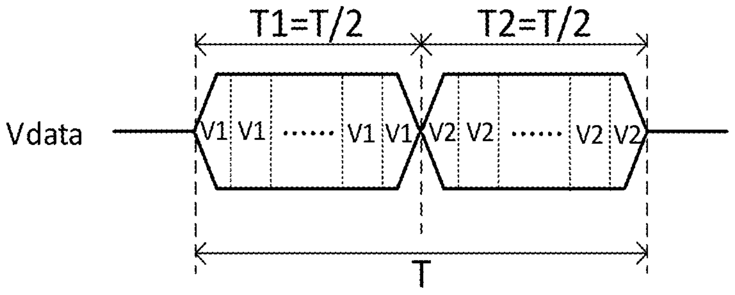
FIG. 7 to FIG. 10 are schematic diagrams of a division of data signals provided by embodiments of the present invention.
Figure 8:
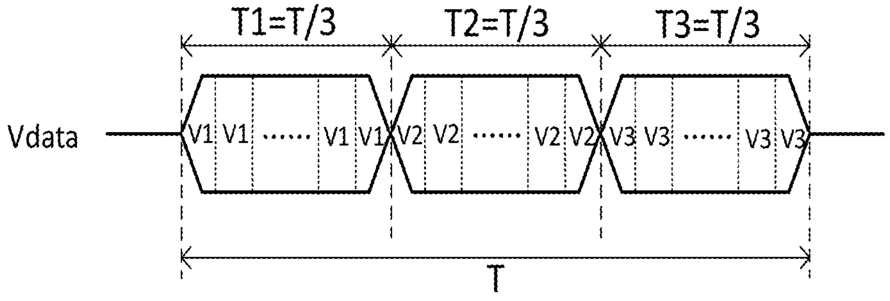

Specifically, here take the frame period equal to T as an example to illustrate as follows:

Combined with the above discussion about FIG. 1, the same data line 10 is provided with only the first sub-pixel 201 and the second sub-pixel 202. That is, the data line 10 may only be used to transmit the first data voltage V1 and the second data voltage V2. Therefore, a frame can be divided into the first period and the second period whose duration is equal to T1 and T2 respectively, and the first sub-pixels 201 and the second sub-pixels 202 are arranged alternately. In the case where the row refresh rates of the sub-pixels are consistent and the time interval between or before and after the first period and the second period is not considered, as shown in FIG. 7, it can be set to T1=T2=T/2. For example, the first sub-pixel 201 and the second sub-pixel 202 are located in odd-numbered rows and even-numbered rows respectively. For each data line 10, it can be considered that during the first period and the second period, a plurality of first data voltages V1 and a plurality of second data voltages V2 are transmitted respectively, and the order of the first period and the second period is not limited here.

Combined with the above discussion about FIG. 2, the same data line 10 is connected to the first sub-pixel 201, the second sub-pixel 202, and the third sub-pixel 203. That is, the data line 10 may be used to transmit the first data voltage V1, the second data voltage V2, and the third data voltage V3. Therefore, one frame can be divided into first period, second period, and third period whose durations are respectively equal to T1, T2, and T3. Based on the above discussion, it can be seen that each pixel group includes two first sub-pixels 201, one second sub-pixel 202, and one third sub-pixel 203. If the same data line 10 is connected to an integer number of pixel groups, it can be considered that the number of the second sub-pixels 202 and the third sub-pixels 203 is half of the number of the first sub-pixels 201. Then it can be set to T1=2*T2=2*T3=T/2. Observing FIG. 2, it can be seen that, for example, the first sub-pixel 201, the second sub-pixel 202, and the third sub-pixel 203 are respectively located in the 2k row, the (4k−3) row, and the (4k−1) row, and k is a positive integer. The order of the three periods is not limited here. In particular, since the second voltage interval and the third voltage interval are relatively close, the second period and the first period can be arranged continuously. This further realizes the transition of voltage jump between two adjacent periods.

Combined with the above discussion about FIG. 2, the same data line 10 is connected to the first sub-pixel 201, the second sub-pixel 202, and the third sub-pixel 203. That is, the data line 10 may be used to transmit the first data voltage V1, the second data voltage V2, and the third data voltage V3. Therefore, one frame can be divided into first period, second period, and third period whose durations are respectively equal to T1, T2, and T3. Based on the above discussion, it can be seen that each pixel group includes two first sub-pixels 201, one second sub-pixel 202, and one third sub-pixel 203. If the same data line 10 is connected to an integer number of pixel groups, it can be considered that the number of the second sub-pixels 202 and the third sub-pixels 203 is half of the number of the first sub-pixels 201. Then it can be set to T1=2*T2=2*T3=T/2. Observing FIG. 2, it can be seen that, for example, the first sub-pixel 201, the second sub-pixel 202, and the third sub-pixel 203 are respectively located in the 2k row, the (4k−3) row, and the (4k−1) row, and k is a positive integer. The order of the three periods is not limited here. In particular, since the second voltage interval and the third voltage interval are relatively close, the second period and the first period can be arranged continuously. This further realizes the transition of voltage jump between two adjacent periods.

Figure 9:
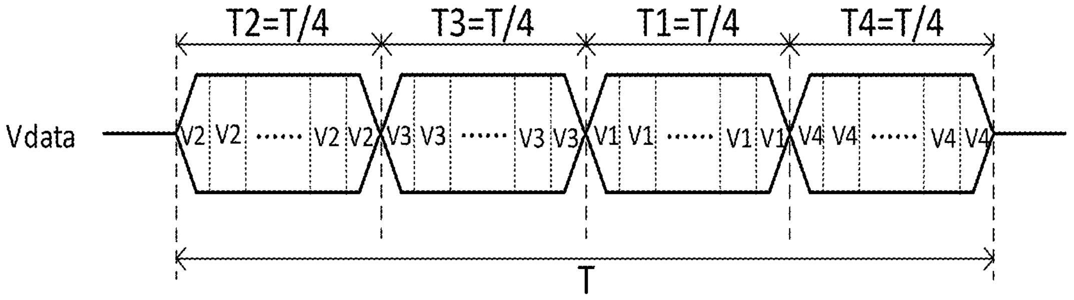

Combined with the above discussion about FIG. 3, the same data line 10 is provided with a first sub-pixel 201, a second sub-pixel 202, a third sub-pixel 203, and a fourth sub-pixel. That is, the data line 10 may be used to transmit the first data voltage V1, the second data voltage V2, the third data voltage V3, and the fourth data voltage V4. Therefore, one frame can be divided into a first period, a second period, a third period, and a fourth period whose durations are respectively equal to T1, T2, T3, and T4. Based on the above discussion, it can be seen that each pixel group includes a first sub-pixel 201, a second sub-pixel 202, a third sub-pixel 203, and a fourth sub-pixel. If the same data line 10 is connected to an integer number of pixel groups, as shown in FIG. 9, it can be set to T1=T2=T3=T4=T/4. Observing FIG. 3, it can be seen that, for example, the first sub-pixel 201, the second sub-pixel 202, the third sub-pixel 203, and the fourth sub-pixel are respectively located at row (4k−2), row (4k−3), row (4k−1), and row 4k, k is a positive integer. The order of the four periods is not limited here. In particular, if the second voltage interval, the third voltage interval, the first voltage interval, and the fourth voltage interval increase or decrease in sequence, the four periods can also be arranged in the order of the second period, the third period, the first period, and the fourth period to further realize the transition of the voltage jump between two adjacent periods.

Figure 10:
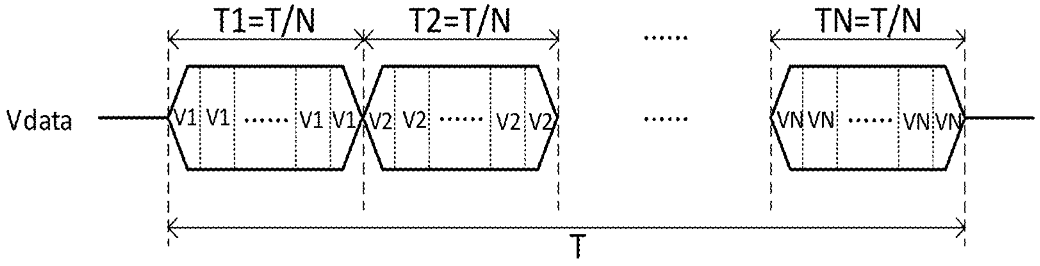

To sum up, as shown in FIG. 10, an appropriate voltage interval can be set according to the relative sizes of multiple data voltages corresponding to multiple sub-pixels connected to the same data line 10. Assuming that the number of voltage intervals is N (N is greater than or equal to 2), the plurality of sub-pixels can also be divided into at least one first sub-pixel 201 up to at least one Nth sub-pixel. Correspondingly, each frame period T needs to be divided into N periods (the first period to the Nth period). Furthermore, it can be considered that the periods are divided into equal parts, that is, the duration of each period is equal and equal to T/N. Based on the fact that the refresh rate of each row is the same, the number of corresponding data voltages transmitted in each period is i as an example. It can be considered that each pixel group includes the first sub-pixel 201 up to the Nth sub-pixel arranged in sequence. Then, in the first period, the first sub-pixels 201 of all the (k*N+1)th rows corresponding to the plurality of first data voltages V1 (in the first voltage interval) can be controlled to emit light. In the second period, all the second sub-pixels 202 of the (k*N+2)th row corresponding to the plurality of second data voltages V2 (in the second voltage interval) can be controlled to emit light, and so on. In the Nth period, the Nth sub-pixels of all the k*Nth rows corresponding to the plurality of Nth data voltages VN (in the Nth voltage interval) can be controlled to emit light.

Specifically, based on the fact that the first period and the second period are included in the same frame period, step S1 may include:

S11: In the first sub-frame period of the frame period, scan multiple rows of sub-pixels in sequence, and when multiple rows of the first sub-pixels are turned on sequentially, corresponding plurality of first data voltages are sequentially loaded, and the first period is included in the first sub-frame period.

Step S2 may include:

S12: In the second sub-frame period of the frame period, scan multiple rows of the sub-pixels in sequence, and when multiple rows of second sub-pixels are turned on sequentially, corresponding plurality of second data voltages are sequentially loaded, the second period is included in the second sub-frame period, and the duration of the first sub-frame period is equal to the duration of the second sub-frame period.

On the basis of FIG. 7 to FIG. 10, it may be further configured to divide the frame period into multiple sub-frame periods of equal duration (including at least a first sub-frame period and a second sub-frame period). That is, within a frame period equal to T, all rows of sub-pixels can be scanned at least N (N is greater than or equal to 2) times, and the duration of each scan of all rows of sub-pixels can be equal to T/N.

In step S11, a period for scanning multiple rows of first sub-pixels in the first sub-frame period may be called a corresponding first period. In step S12, a period for scanning multiple rows of second sub-pixels in the second sub-frame period may be called a corresponding second period. Similarly, for each data line 10, it can be considered that a plurality of first data voltages V1 and a plurality of second data voltages V2 are respectively transmitted in the first period of the first sub-frame period and in the corresponding second period of the second sub-frame period. Here, the order of the first sub-frame period and the second sub-frame period is not limited.

It is understood that the present invention does not limit whether the first period and the second period are included in the same frame period. Based on the premise that the frame period is certain, when the first period and the second period are included in different frame periods, for example, in the first period of the previous frame period, multiple corresponding first data voltages can be transmitted sequentially through multiple data lines to control each first sub-pixel in the display panel to load the corresponding first data voltage, and in the second period of the next frame period, the corresponding plurality of second data voltages can be transmitted sequentially through the plurality of data lines to control each first sub-pixel in the display panel to load the corresponding second data voltage. There are no limitations here on the position and proportion of the first period in the previous frame and the position and proportion of the second period in the subsequent frame. There may or may not be a gap between the first period and the second period.

Figure 11:
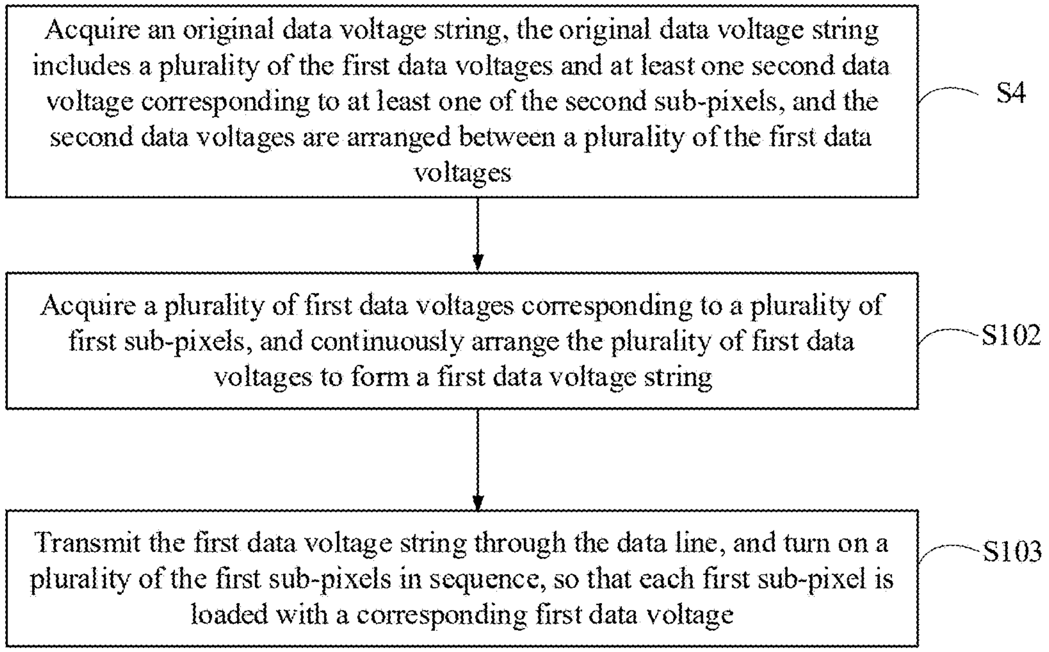

In an embodiment, as shown in FIG. 11, the above step S1 may include but is not limited to the following steps.

S102: Acquire a plurality of first data voltages corresponding to a plurality of first sub-pixels, and continuously arrange the plurality of first data voltages to form a first data voltage string.

Based on the above discussion, it can be seen that multiple first sub-pixels 201 need to be controlled to emit light within a first period. Furthermore, in order to ensure the frame refresh rate of the display panel 100, in this embodiment, a plurality of first data voltages V1 are continuously arranged to form a first data voltage V1 string. This allows multiple first data voltages V1 to be arranged continuously to avoid interspersing unused second data voltages V2 in the first period, thereby increasing the overall transmission rate of the first data voltages V1.

S103: Transmit the first data voltage string through the data line, and turn on a plurality of the first sub-pixels in sequence, so that each first sub-pixel is loaded with a corresponding first data voltage.

Following the above discussion, the first data voltage V1 string only includes a plurality of first data voltages V1. Therefore, the data line 10 transmits the first data voltage V1 string. Cooperating with the multiple gate signals transmitted by the multiple gate lines as discussed above, it is possible to only turn on the first data voltage sequentially and load the first data voltage V1 to the multiple first sub-pixels 201 connected to the same data line 10 in the first period, thereby only controlling the plurality of first sub-pixels 201 to emit light.

Similarly, the above step S2 may also include but is not limited to the following steps.

S202: Acquire a plurality of second data voltages corresponding to a plurality of second sub-pixels, and continuously arrange the plurality of second data voltages to form a second data voltage string.

Reference may be made to the above description of step S102.

S203: Transmit the second data voltage string through the data line, and turn on a plurality of the second sub-pixels in sequence, so that each second sub-pixel is loaded with a corresponding second data voltage.

Reference may be made to the above description of step S103.

In an embodiment, as shown in FIG. 11, the above-mentioned steps S1 and S2 may include but are not limited to the following steps.

S4: Acquire an original data voltage string, the original data voltage string includes a plurality of the first data voltages and at least one second data voltage corresponding to at least one of the second sub-pixels, and the second data voltages are arranged between a plurality of the first data voltages.

Specifically, based on the above discussion about FIG. 1 to FIG. 3, it can be seen that it can be considered that the arrangement order of the data voltages in the original data voltage string received by the timing control module corresponds to the arrangement order of multiple sub-pixels connected to the same data line 10. For example, the original data voltage string in FIG. 1 includes alternately arranged first data voltages V1 and second data voltages V2. For another example, the original data voltage string in FIG. 2 includes the second data voltage V2, the first data voltage V1, the third data voltage V3, and the first data voltage V1 arranged in sequence, and is arranged as a cyclic unit. For another example, the original data voltage string in FIG. 3 includes the second data voltage V2, the first data voltage V1, the third data voltage V3, and the fourth data voltage V4 arranged in sequence, and is arranged as a cyclic unit.

Therefore, the above steps S102 to S103 and steps S202 to S203 are executed through but not limited to the timing control module and the source driving module. The original data voltage string is converted into a data signal including a first data voltage string V1 and a second data voltage string V2. In conjunction with the plurality of gate signals transmitted by the plurality of gate lines, all the first sub-pixels 201 and all the second sub-pixels 202 are controlled to emit light in the first period and the second period respectively.

The present invention also provides a display panel, which is used to perform the compensation method of the display panel as described in any one of the above.

In one embodiment, as shown in FIG. 1 to FIG. 3, the display panel 100 includes the above-mentioned plurality of gate lines. Each gate line connects a corresponding (row) plurality of first sub-pixels 201 or a corresponding (row) plurality of second sub-pixels 202. Each of the above-mentioned plurality of data lines 10 connects a corresponding (column) plurality of first sub-pixels 201 and a corresponding (same column) plurality of second sub-pixels 202. A plurality of first gate driving circuits 401 are arranged in cascade, and each first gate driving circuit 401 is electrically connected to a corresponding (row) plurality of first sub-pixels 201 through the corresponding gate line. A plurality of second gate driving circuits 402 are arranged in cascade, and each second gate driving circuit 402 is electrically connected to a corresponding (row) plurality of second sub-pixels 202 through the corresponding gate line. The plurality of first gate driving circuits 401 and the plurality of second gate driving circuits 402 are respectively used to operate during the first period and the second period, such that the corresponding plurality of first sub-pixels 201 and the corresponding plurality of second sub-pixels 202 are controlled to be turned on so as to be electrically connected to the corresponding data lines 10 respectively.

Specifically, for example, as shown in FIG. 2, the display panel 100 may further include a plurality of third gate driving circuits 403 arranged in cascade and corresponding to a plurality of third sub-pixels 203. For example, as shown in FIG. 3, the display panel 100 may further include a plurality of fourth gate driving circuits 404 arranged in cascade and corresponding to a plurality of fourth sub-pixels. A start signal acts on the first-stage gate driving circuit in each gate driving circuit. Cooperate with the functions of multiple gate drive circuits to achieve signal level transmission and output. As shown in FIG. 1 to FIG. 3, a first-stage first gate driving circuit 401, a first-stage second gate driving circuit 402, a first-stage third gate driving circuit 403, and a first-stage fourth gate driving circuit 404 can be respectively loaded with a first start signal STV1, a second start signal STV2, a third start signal STV3, and a fourth start signal STV4.

Figure 12:
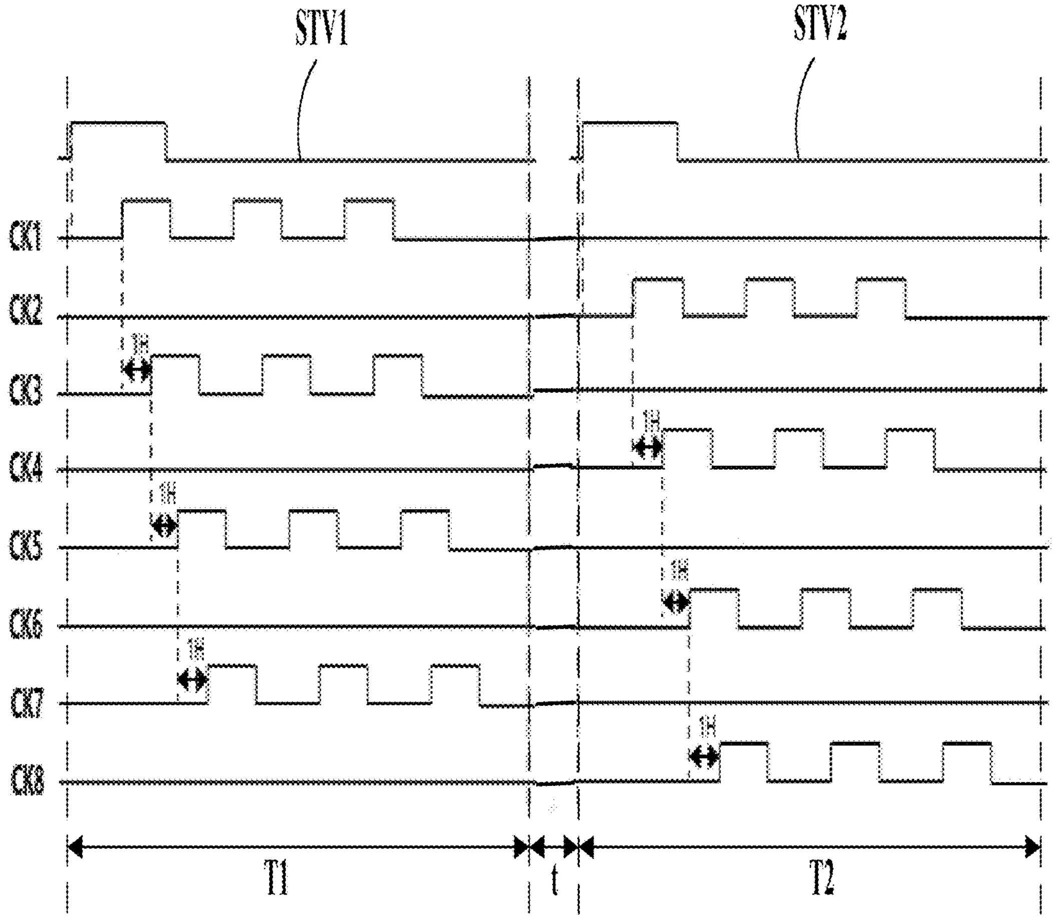
FIG. 12 is a waveform diagram of some signals in a gate driving circuit.

As shown in FIG. 12, the gate driving architecture in FIG. 1 is used as an example for explanation. The starting point of the starting effective pulse of the second starting signal may be located after the end point of the gate effective pulse in the gate signal output by the last stage first gate driving circuit 401. Furthermore, each stage of the gate driving circuit also needs to be loaded with a clock signal. Here, the clock signals CK1, CK3, CK5, and CK7 are respectively loaded to the first to fourth-stage first gate driving circuits 401. As an example, the clock signals CK2, CK4, CK6, and CK8 are respectively loaded into the first to fourth-stage second gate driving circuits 402:

In the first period equal to T1, the start pulse in the first start signal causes the first-stage first gate driving circuit 401 to start operating. CK1, CK3, CK5, and CK7 have clock pulses in sequence (the time interval between the starting points of the clock pulses of two adjacent clock signals can be 1H) to sequentially control the operation of the first gate driving circuit 401 of the first to fourth stages, to sequentially generate four gate effective pulses for turning on the first sub-pixels 201 in the first to fourth rows.

During the second period equal to T2, the start pulse in the second start signal causes the first-stage first gate driving circuit 401 to start operating. CK2, CK4, CK6, and CK8 have clock pulses in sequence (the time interval between the starting points of the clock pulses of two adjacent clock signals can be 1H) to sequentially control the operation of the second gate driving circuit 402 of the first to fourth stages, to sequentially generate four gate effective pulses for turning on the second sub-pixels 202 in the first to fourth rows.

Further, there may be a time interval t between the first period and the second period to distinguish the two periods.

The present invention provides a display panel and a compensation method thereof. The display panel includes a plurality of data lines and a plurality of first sub-pixels and at least one second sub-pixel connected to the same data line. The second sub-pixels are disposed between the plurality of first sub-pixels. The method controls each of the first sub-pixels to load a corresponding first data voltage and each of the second sub-pixels to load a corresponding second data voltage in a non-overlapping first period and a second period respectively. A first voltage interval in which the plurality of first data voltages are located and a second voltage interval in which the plurality of second data voltages are located do not overlap. This allows the data line to continuously transmit a plurality of first data voltages with smaller variables and then continuously transmit a plurality of second data voltages with smaller variables. This reduces a frequency of voltage jumps, thereby effectively improving a charging efficiency of the first sub-pixel and a charging efficiency of the second sub-pixel. Thereby, the effect of improving a deterioration of viewing angle characteristics in the liquid crystal display panel is improved, and reliability of a screen display of the display panel is improved.

The display panel and its compensation method provided by the embodiments of the present invention are introduced in detail above. This article uses specific examples to illustrate the principles and implementation methods of the present invention. The description of the above embodiments is only used to help understand the technical solution and its core idea of the present invention. Those of ordinary skill in the art should understand that they can still modify the technical solutions described in the foregoing embodiments or make equivalent substitutions for some of the technical features. However, these modifications or substitutions do not cause the essence of the corresponding technical solution to depart from the scope of the technical solution of each embodiment of the present invention.

What is claimed is:

1. A compensation method of a display panel, wherein the display panel comprises a plurality of data lines, and a plurality of first sub-pixels and at least one second sub-pixel which are connected to one of the data lines and disposed in a column along an extending direction of the one of the data lines, each of the at least one second sub-pixel is disposed between two adjacent ones of the plurality of the first sub-pixels, and the method comprises:

controlling each of the first sub-pixels to load a corresponding one of a plurality of first data voltages in a first period, wherein the plurality of the first data voltages are in a first voltage interval;

controlling each of the at least one second sub-pixel to load a corresponding one of a plurality of second data voltages in a second period, wherein the plurality of second data voltages are in a second voltage interval, the second period does not overlap with the first period, and the second voltage interval does not overlap with the first voltage interval.

2. The compensation method of the display panel according to claim 1, wherein the plurality of first data voltages are the same, and/or the plurality of second data voltages are the same.

3. The compensation method of the display panel according to claim 1, wherein the at least one second sub-pixel comprises two or more second sub-pixels, a color of the first sub-pixels and a color of the second sub-pixels are the same, and the first sub-pixels and the second sub-pixels are arranged alternately along the extending direction of the one of the data lines.

4. The compensation method of the display panel according to claim 1, wherein the first period and the second period are included in the same frame period.

5. The compensation method of the display panel according to claim 4, wherein controlling each of the first sub-pixels to load the corresponding one of the plurality of first data voltages comprises:

acquiring the first data voltages corresponding to the first sub-pixels, and continuously arranging the first data voltages to form a first data voltage string;

transmitting the first data voltage string through the one of the data lines, and sequentially turning on the first sub-pixels, so that each of the first sub-pixels is loaded with the corresponding one of the first data voltages.

6. The compensation method of the display panel according to claim 5, wherein before controlling each of the first sub-pixels to load the corresponding one of the plurality of first data voltages and controlling each of the at least one second sub-pixel to load the corresponding one of the plurality of second data voltages comprises:

acquiring an original data voltage string, wherein the original data voltage string comprises the first data voltages and at least one second data voltage corresponding to the at least one second sub-pixel, and the at least one second data voltage is arranged between two ones of the first data voltages.

7. The compensation method of the display panel according to claim 1, wherein the one of the data lines is further connected to at least one third sub-pixel, the at least one third sub-pixel is provided between two ones of the first sub-pixels, and one of the first sub-pixels is disposed between the at least one second sub-pixel and the at least one third sub-pixel, the method further comprises:

controlling each third sub-pixel to load a corresponding one of a plurality of third data voltages during a third period, wherein the third data voltages are in a third voltage interval, the third period, the second period, and the first period do not overlap, the third voltage interval, the second voltage interval, and the first voltage interval do not overlap, and both the second voltage interval and the third voltage interval are greater than or less than the first voltage interval.

8. The compensation method of the display panel according to claim 7, wherein the at least one second sub-pixel comprises two or more second sub-pixels and the at least one third sub-pixel comprises two or more third sub-pixels, the one of the data lines is connected to a plurality of pixel groups, and each pixel group comprises one of the at least one second sub-pixel, one of the first sub-pixels, one of the at least one third sub-pixel, and another one of the first sub-pixels arranged in sequence.

9. The compensation method of the display panel according to claim 1, wherein the display panel comprises a plurality of sub-pixels, and the sub-pixels comprises the first sub-pixels and the at least one second sub-pixel;

wherein controlling each of the first sub-pixels to load the corresponding one of the plurality of first data voltages in the first period comprises:

sequentially scanning a plurality of rows of the sub-pixels in a first sub-frame period in a frame period, and when the plurality of rows of the sub-pixels are turned on sequentially, sequentially loading corresponding plurality of the first data voltages, wherein the first period is included in the first sub-frame period;

wherein controlling each of the at least one second sub-pixel to load the corresponding one of the plurality of second data voltages in the second period comprises:

sequentially scanning a plurality of rows of the sub-pixels in a second sub-frame period in a frame period, and when the plurality of rows of second sub-pixels are turned on sequentially, sequentially loading corresponding plurality of second data voltages, wherein the second period is included in the second sub-frame period, and a duration of the first sub-frame period is equal to a duration of the second sub-frame period.

10. A display panel configured to perform a compensation method of the display panel, wherein the display panel comprises a plurality of data lines, and a plurality of first sub-pixels and at least one second sub-pixel which are connected to one of the data lines and disposed in a column along an extending direction of the one of the data lines, each of the at least one second sub-pixel is disposed between two adjacent ones of the plurality of the first sub-pixels, and the method comprises:

controlling each of the first sub-pixels to load a corresponding one of a plurality of first data voltages in a first period, wherein the plurality of the first data voltages are in a first voltage interval;

controlling each of the at least one second sub-pixel to load a corresponding one of a plurality of second data voltages in a second period, wherein the plurality of second data voltages are in a second voltage interval, the second period does not overlap with the first period, and the second voltage interval does not overlap with the first voltage interval.

11. The display panel according to claim 10, wherein the plurality of first data voltages are the same.

12. The display panel according to claim 10, wherein the plurality of second data voltages are the same.

13. The display panel according to claim 10, wherein the at least one second sub-pixel comprises two or more second sub-pixels, a color of the first sub-pixels and a color of the second sub-pixels are the same, and the first sub-pixels and the second sub-pixels are arranged alternately along the extending direction of the one of the data lines.

14. The display panel according to claim 10, wherein the first period and the second period are included in the same frame period.

15. The display panel according to claim 14, wherein controlling each of the first sub-pixels to load the corresponding one of the plurality of first data voltages comprises:

acquiring the first data voltages corresponding to the first sub-pixels, and continuously arranging the first data voltages to form a first data voltage string;

transmitting the first data voltage string through one of the data lines, and sequentially turning on the first sub-pixels, so that each of the first sub-pixels is loaded with the corresponding one of the first data voltages.

16. The display panel according to claim 15, wherein before controlling each of the first sub-pixels to load the corresponding one of the plurality of first data voltages and controlling each of the at least one second sub-pixel to load the corresponding one of the plurality of second data voltages comprises:

acquiring an original data voltage string, wherein the original data voltage string comprises the first data voltages and at least one second data voltage corresponding to the at least one second sub-pixel, and the at least one second data voltage is arranged between two ones of the first data voltages.

17. The display panel according to claim 10, wherein the one of the data lines is further connected to at least one third sub-pixel, the at least one third sub-pixel is provided between two ones of the first sub-pixels, and one of the first sub-pixels is disposed between the at least one second sub-pixel and the at least one third sub-pixel, the method further comprises:

controlling each third sub-pixel to load a corresponding one of a plurality of third data voltages during a third period, wherein the third data voltages are in a third voltage interval, the third period, the second period, and the first period do not overlap, the third voltage interval, the second voltage interval, and the first voltage interval do not overlap, and both the second voltage interval and the third voltage interval are greater than or less than the first voltage interval.

18. The display panel according to claim 17, wherein the at least one second sub-pixel comprises two or more second sub-pixels and the at least one third sub-pixel comprises two or more third sub-pixels, the one of the data lines is connected to a plurality of pixel groups, and each pixel group comprises one of the at least one second sub-pixel, one of the first sub-pixels, one of the at least one third sub-pixel, and another one of the first sub-pixels arranged in sequence.

19. The display panel according to claim 10, wherein the display panel comprises a plurality of sub-pixels, and the sub-pixels comprises the first sub-pixels and the at least one second sub-pixel.

20. The display panel according to claim 19, wherein controlling each of the first sub-pixels to load the corresponding one of the plurality of first data voltages in the first period comprises:

sequentially scanning a plurality of rows of the sub-pixels in a first sub-frame period in a frame period, and when the plurality of rows of the sub-pixels are turned on sequentially, sequentially loading corresponding plurality of the first data voltages, wherein the first period is included in the first sub-frame period;

wherein controlling each of the at least one second sub-pixel to load the corresponding one of the plurality of second data voltages in the second period comprises:

sequentially scanning a plurality of rows of the sub-pixels in a second sub-frame period in a frame period, and when the plurality of rows of second sub-pixels are turned on sequentially, sequentially loading corresponding plurality of second data voltages, wherein the second period is included in the second sub-frame period, and a duration of the first sub-frame period is equal to a duration of the second sub-frame period.

* * * * *